United States Patent [19]

Friesen et al.

[11] 4,337,015
[45] Jun. 29, 1982

[54] PARKING STAND MEANS FOR TRACTOR-DISMOUNTED IMPLEMENT

[75] Inventors: Henry Friesen, Niagara Falls; Clarence R. Trott, Welland, both of Canada

[73] Assignee: Deere & Company, Moline, Ill.

[21] Appl. No.: 161,840

[22] Filed: Jun. 23, 1980

[51] Int. Cl.³ .............................................. E02F 3/14
[52] U.S. Cl. .................................... 414/686; 172/274; 212/189
[58] Field of Search ................. 212/189; 280/763, 765; 414/686; 172/274

[56] References Cited

U.S. PATENT DOCUMENTS

| | | | |
|---|---|---|---|
| 2,833,432 | 5/1958 | Foster | 414/686 X |
| 3,454,251 | 7/1969 | Dye | 280/765 X |
| 4,247,242 | 1/1981 | Goertzen | 414/686 |
| 4,257,730 | 3/1981 | Kawakita | 414/686 |
| 4,275,984 | 6/1981 | Lenertz | 414/686 |

Primary Examiner—David A. Scherbel
Attorney, Agent, or Firm—Henderson & Sturm

[57] ABSTRACT

A parking stand means for use as a strut between the ground and an elevated portion of a tractor-dismounted implement which has also an associated part resting on the ground so that the strut and a portion of the implement form a triangular support for the implement. The strut is carried by the implement for uphill and downhill sliding between retracted and supporting or park positions and is also connected in such manner that it can swing forwardly toward the implement for retracted position and rearwardly to its park position. A pin is provided for selectively locking the support in either position. A further feature is a device for preventing rearward swinging of the support until it has traveled downhill through a predetermined range.

4 Claims, 6 Drawing Figures

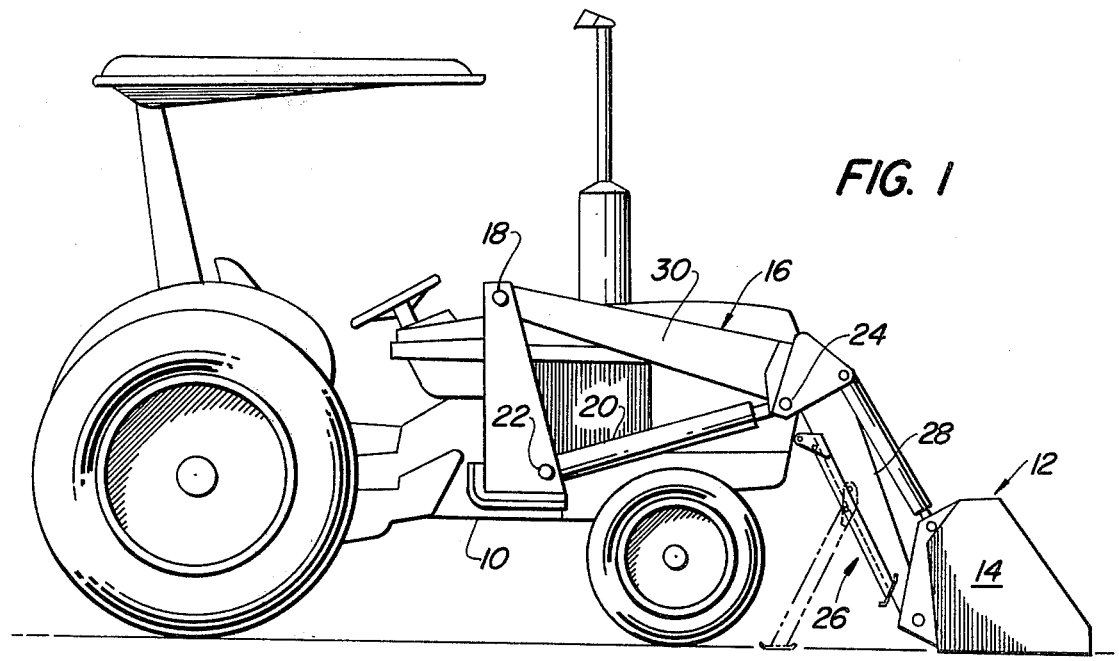
FIG. 1
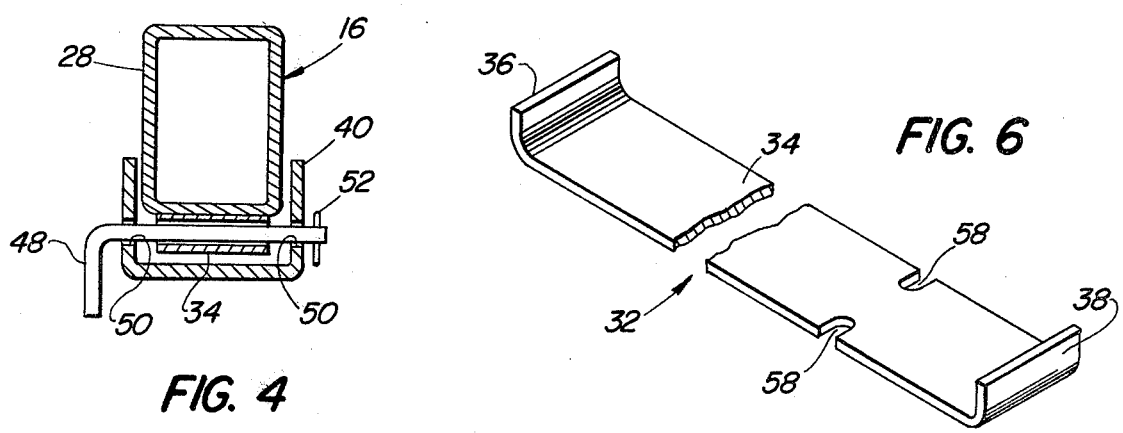
FIG. 4
FIG. 6
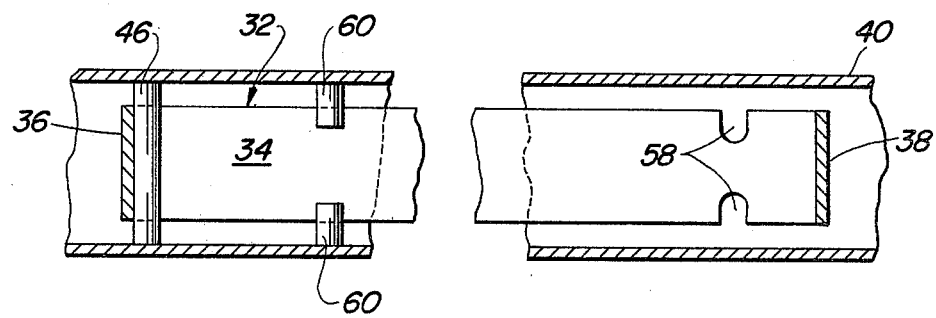
FIG. 5

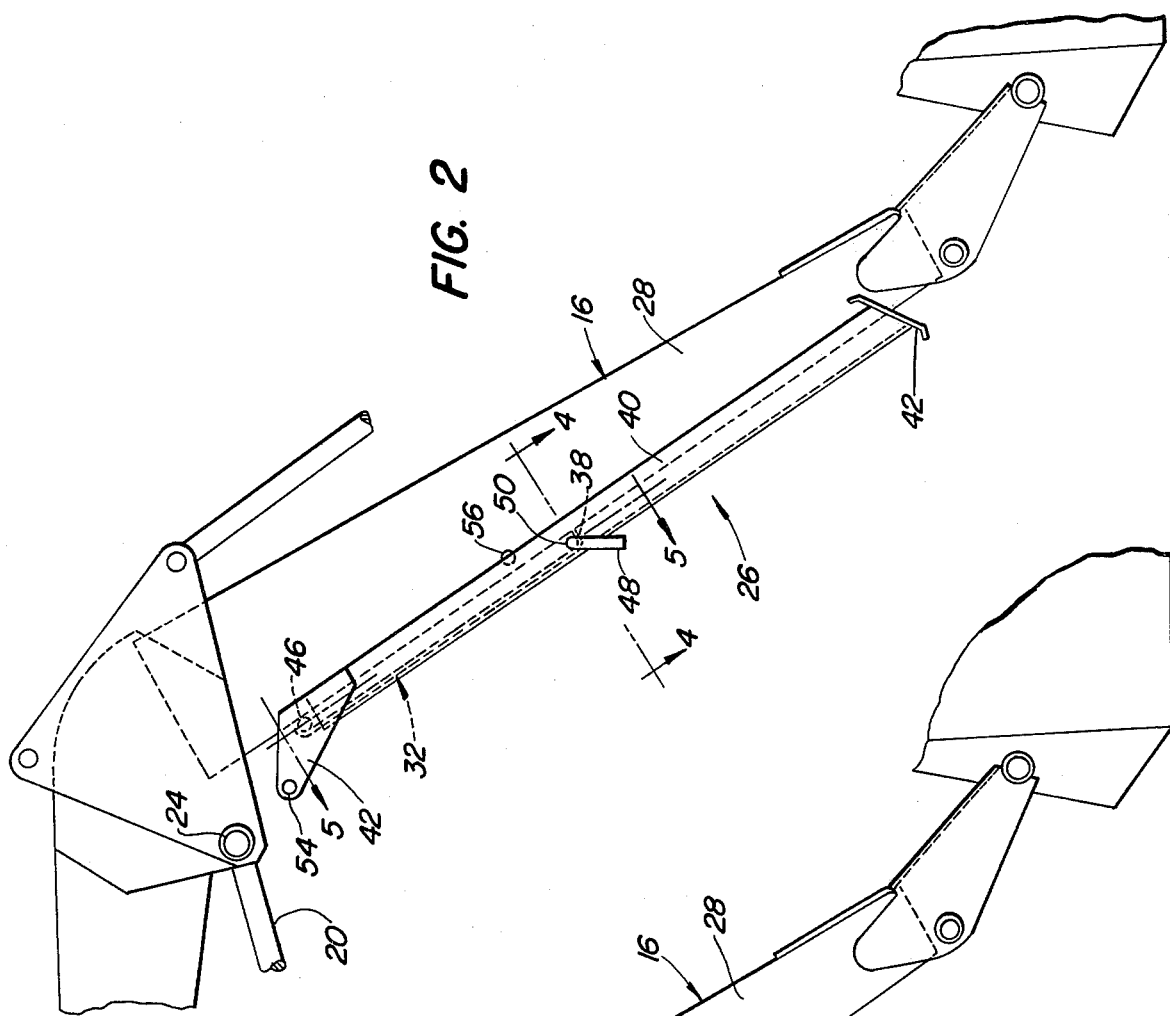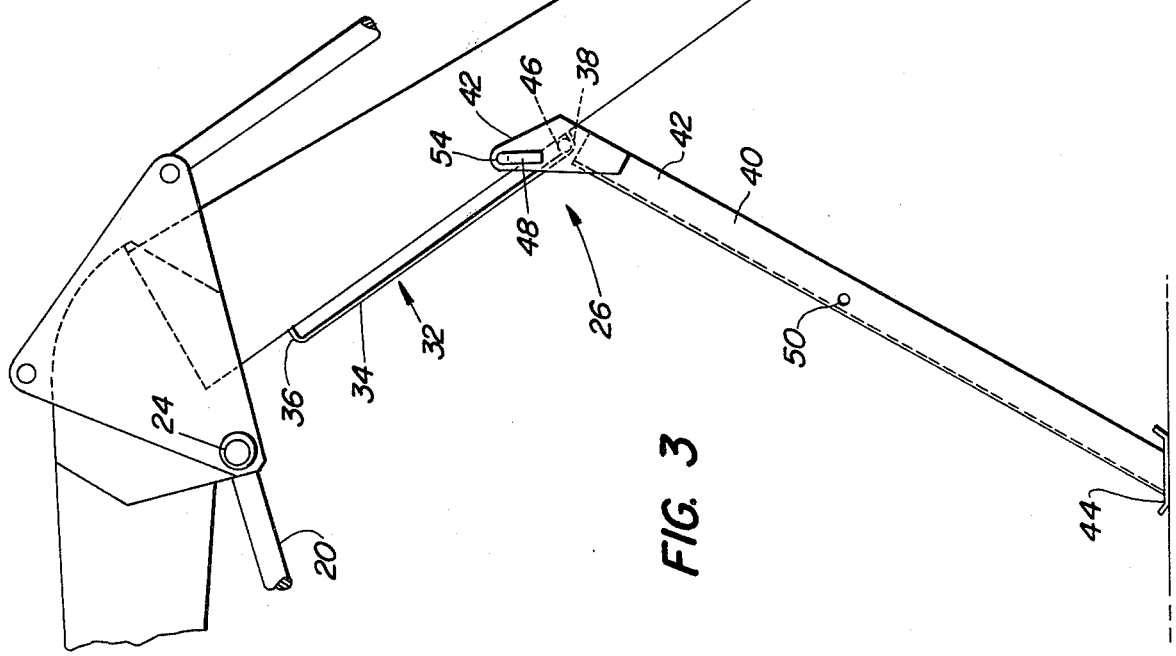

PARKING STAND MEANS FOR TRACTOR-DISMOUNTED IMPLEMENT

SUMMARY OF THE INVENTION

Typical of a tractor-implement arrangement in which the invention finds significant utility is the well-known front loader having a pair of frame elements in the form of lift arms provided at their front ends with a loader bucket and connected at their rear ends to the tractor for raising and lowering as by means of hydraulic cylinder and piston units. The rear ends of the loader arms are disconnectible from the tractor, as are the hydraulic units, and it is conventional to "park" the dismounted loader by means of its bucket resting on the ground and some additional support means to the rear of the bucket and extending from the ground to rear upper portions of the lift arms. There is no shortage of prior art support means or parking stands, ranging all the way from simple trestles or horses to complicated linkages. The simpler devices have little utility because they are not carried with the implement and thus have to be located and installed each time the implement is dismounted. The complicated mechanisms are difficult to manipulate and quite often parts are lost or misplaced.

The present invention eliminates both of these problems and affords important advantages. The connection of the support or parking strut to the lift arm is permanent. The support strut is of one-piece design and has no separate parts to manipulate or become lost. Its connection to the implement is via slide and pivot means carried by the under, rear side of the lift arm which slopes upwardly and rearwardly toward the tractor and thus rearwardly of the ground-supported bucket. Because of the uphill slide means, the support can be made relatively long, because much of its length, when the support is retracted, will be taken up by sliding the support uphill before swinging it forwardly toward the lift arm for retracted position. Simple locking means is provided for selectively locking the support in either position and, as a further feature, the locking means is common to both positions, so that it must be used in any event and thus is extremely unlikely to become lost. A still further feature is additional means to prevent downward and rearward swinging of the support until it has been moved downhill through a predetermined range, thus avoiding sudden rearward swinging that would be otherwise apt to injure the person changing positions of the support. In this additional means, the cooperative parts are rigidly associated respectively with the slide means and the support, again eliminating loss of parts. The stand means is simply constructed and may be readily adapted to existing implements.

BRIEF DESCRIPTION OF THE DRAWINGS

FIG. 1 is a side view of a typical tractor and associated front loader, showing the parking stand or support in full lines in its retracted position and in dotted lines in its park position.

FIG. 2 is an enlarged side view, with portions broken away to conserve space, showing in greater detail the relationship of the parking stand to the lift arm in its retracted position.

FIG. 3 is a similar view but showing the stand in its park position.

FIG. 4 is a section on the line 4—4 of FIG. 2, with intermediate portions omitted.

FIG. 5 is a section on the line 5—5 of FIG. 2, with intermediate portions omitted.

FIG. 6 is a perspective of the slide means per se, again with portions broken away to fore-shorten the view.

DESCRIPTION OF THE PREFERRED EMBODIMENT

Reference will be had first to FIG. 1, wherein a typical tractor is denoted 10 and a typical front loader 12. The loader has a bucket 14 from which a pair of frame elements or lift arms 16 extend rearwardly to disconnectible pivotal connections 18 with the tractor or additional means carried by the tractor. Only one lift arm 16 and pivot 18 are shown but it will be clear that the structure is duplicated at the opposite side of the tractor. Power means for raising and lowering the lift arms and bucket is provided at each side of the unit, a hydraulic cylinder and piston assembly 20 being representative. Each one is disconnectible from the tractor and lift arm at 22 and 24 respectively. A parking stand means 26 is provided for each lift arm. Since these are identical, only one will be described. The dotted line position in FIG. 1 shows the stand in park position, wherein the loader or equivalent implement, disconnected from the tractor via 18, 22 and 24, is supported by the bucket or equivalent implement part resting on the ground and the extended parking stand disposed in its park position to the rear of the bucket, thus providing the usual triangular support.

The frame element or lift arm 16, as is typical in many front loader designs, is of rigid, elongated construction, preferably of rectangular section as seen in FIG. 4, and has an uphill portion 28 and an integral elevated portion 30, the former extending upwardly and rearwardly from the bucket and the latter extending rearwardly to the tractor pivot 18.

As best shown in FIGS. 2, 3 and 6, the parking stand means includes slide means 32 having a bottom 34 and opposite, uphill and downhill ends 36 and 38 respectively. This slide means is rigidly affixed, as by welding, to the rear, underside of the lift arm sloping or uphill portion 28, the bottom 34 being parallel to that portion and thus extending uphill relative to the ground and toward the elevated portion 30 of the lift arm. The parking stand means further includes a strut-like support 40, preferably of one-piece construction, having upper and lower ends 42 and 44 respectively, the latter being in form of a ground-engaging pad. This support is of channel section, opening forwardly toward the rear of the lift arm portion and of such dimensions as to nest with the portion 28 when in retracted position (FIG. 4). The upper end of the support is connected to the lift arm via the slide means and a guide in the form of a cross pin 46 which passes through opposite flanges of the support member and through the slide means. The upper end of the support is thus carried by the slide means for uphill and downhill movement relative to the lift arm portion 28 as well as for swinging movement about the cross pin 46 toward and away from the lift arm portion. When the support is swung toward the lift arm portion and moved uphill to the top or uphill end of the slide means, it occupies its retracted or transport position (FIG. 2), in which position it is releasably locked in place by lock means in the form of an L-shaped pin 48 inserted through aligned holes 50 in the support flanges and through the slide means at the downhill end 38 thereof (FIGS. 2 and 4). A cotter 52 of any type may be used to retain the pin. Thus, in its retracted position, the support is confined to the slide means by the cross pin or guide 46 and the locking pin 48 and cannot move either slidably or pivotally.

The upper end 42 of the support 40 is formed by a pair of extensions having transversely aligned openings 54 for receiving the lock pin 48 when the support is moved to its park position, at which time the cross pin 46 runs downhill in the slide means until it is stopped by the lower end of the slide means (FIG. 3). When the support is swung to the rear, the holes 54 become aligned with the holes 56 in the sides of the lift arm portion 28 and, when the pin 48 is passed through these aligned holes, the support is locked against both pivoting and uphill sliding and thus becomes a rigid strut engaging the ground via its lower end 44 in rearwardly spaced relationship to the ground-supported bucket.

It is possible, in the absence of due care, that, when the lock pin is released from its FIG. 2 position, the support 40 could move rapidly downhill in the slide means and also rapidly rearwardly by gravity, perhaps injuring a person having his leg, for example, in the way. To guard against this, means in addition to the lock pin 48 is provided, the purpose of which is to prevent rearward swinging of the support until it has moved downhill through a predetermined range, and the operator positions it for rearward swinging movement. This means is best shown in FIGS. 5 and 6, wherein it is seen that the bottom of the slide means has a pair of transversely aligned notches 58 adjacent to its lower or downhill end and the support has a pair of transversely aligned projections or studs 60 disposed toward the upper end 42 of the support. When the support is in its uphill or retracted position, the studs rest on the slide means bottom 34 and the support cannot swing downwardly. However, when the lock pin 48 is removed, the support can begin sliding downhill. If the operator does not slow the downward sliding movement of the support, it will slide to the bottom of the slide means and the studs 60 will slide over the notches and engage the downhill portion 38 of the slide means. Thus, the studs 60 of the support 40 will not pass through the notches 58 until the operator carefully positions them in the notches 38 and rotates the support about its pin 46. As the studs are swung through the notches, the support is free to swing to the rear. When the support is to be returned to its retracted position, the support is lifted and slid uphill until the studs are in register with the notches from below. They are then passed through the notches and over the slide means bottom. In this position, the support can be slid from its end position to the top end of the slide means and its stored position.

The manner of using the parking stand means is believed to have been made apparent in the foregoing description, together with its significant features and advantages. Various modifications and alterations in the preferred embodiment will occur to those versed in the art, all without departing from the spirit and scope of the invention.

We claim:

1. For a tractor-dismounted implement having a part adapted to rest on the ground and at least one frame element connected to the part and having an uphill portion extending rearwardly away from the part and an elevated portion above the ground: a parking stand for supporting the elevated portion of the part above the ground having elongated uphill slide means carried by the uphill portion of the element adjacent to the elevated portion of the element and having a lower stop portion, a strut-like support having upper and lower ends, a combination guide and pivot member connecting the upper end of the support to the slide means for uphill movement as well as for swinging of the support forwardly toward and adjacent to the uphill portion of the element to occupy a retracted position in which the lower end of the support is clear of the ground and, selectively, for downhill movement in the slide means until said member engages the lower stop portion and becomes pivoted thereat for rearward swinging of the support away from the uphill portion of the element to occupy a parking position in which the lower end of the support engages the ground in rearwardly spaced relationship to the aforesaid part, the improvement comprising an extension rigid on an upper part of the support and providing an arm extending away from the combination guide and pivot member and arranged to lie closely alongside the uphill portion of the frame element in the parking position of the support, and a lock element engageable between the arm and the uphill portion in said parking position to prevent the support from both swinging and sliding, said lock element being disengageable from the arm and support and engageable the support and the uphill portion in the transport position of the support to retain the support against both sliding and swinging.

2. The parking stand of claim 1, including the further improvement of release means additional to said lock element until the support is moved downhill in the slide means through a predetermined range.

3. The parking stand means of claim 2, including the further improvement in which the slide means has a bottom provided with a notch in a downhill portion thereof and the support has a projection slidable along the bottom through said predetermined range until the projection registers with the notch and passes downwardly therethrough to enable rearward swinging of the support.

4. The parking stand means of claim 3, including the further improvement of a pair of similar notches transversely aligned in the slide means bottom and a pair of like transversely aligned projections adapted to register respectively with and pass downwardly through the notches.

* * * * *

UNITED STATES PATENT AND TRADEMARK OFFICE
CERTIFICATE OF CORRECTION

PATENT NO. : 4,337,015

DATED : June 29, 1982

INVENTOR(S) : Henry Friesen and Clarence R. Trott

It is certified that error appears in the above-identified patent and that said Letters Patent are hereby corrected as shown below:

column 4, line 35, the word "between" should be inserted after --engageable--.

Signed and Sealed this

Sixth Day of September 1983

[SEAL]

Attest:

Attesting Officer

GERALD J. MOSSINGHOFF

Commissioner of Patents and Trademarks